United States Patent
Beard et al.

[19]

[11] Patent Number: 6,060,435
[45] Date of Patent: May 9, 2000

[54] SOLUBILIZED AND REGENERATING IRON REDUCING ADDITIVE

[76] Inventors: Ricky N. Beard, 2700 46th St., Snyder, Tex. 79549; Edward F. Vinson, P.O. Box 1208, Snyder, Tex. 79550

[21] Appl. No.: 08/906,182

[22] Filed: Aug. 4, 1997

Related U.S. Application Data

[60] Provisional application No. 60/029,824, Oct. 28, 1996.

[51] Int. Cl.⁷ .............................. C09K 3/00; E21B 43/16
[52] U.S. Cl. ......................... 507/258; 507/249; 507/272; 507/277; 507/933; 507/934; 166/279; 166/300; 166/307
[58] Field of Search .................................. 507/934, 258, 507/272, 249, 277, 933; 166/279, 307, 300

[56] References Cited

U.S. PATENT DOCUMENTS

| | | | |
|---|---|---|---|
| 4,167,214 | 9/1979 | Street . | |
| 4,442,014 | 4/1984 | Looney . | |
| 4,574,050 | 3/1986 | Crowe . | |
| 4,683,954 | 8/1987 | Walker . | |
| 4,871,024 | 10/1989 | Cizek ...................................... | 507/934 |
| 4,949,790 | 8/1990 | Dill et al. ................................ | 507/934 |
| 5,063,997 | 11/1991 | Pachla et al. ........................... | 507/934 |
| 5,084,192 | 1/1992 | Dill . | |
| 5,112,505 | 5/1992 | Jacobs . | |
| 5,445,221 | 8/1995 | Vinson . | |
| 5,547,926 | 8/1996 | Perthuis et al. ......................... | 507/258 |
| 5,622,921 | 4/1997 | Dyer et al. .............................. | 507/934 |
| 5,674,817 | 10/1997 | Brezinski et al. ...................... | 507/258 |

FOREIGN PATENT DOCUMENTS 2070212  12/1992  Canada .

OTHER PUBLICATIONS

Williams et al., Acidizing Fundamentals (1979).
Houchin et al., The Occurrence and Control of Acid–Induced Asphaltene Sludge SPE 19410, (1990).
Chemical Abstracts—vol. 79, (1973); vol. 86, (1977); vol. 106, (1987) (2 pages); vol. 110, (1989).

*Primary Examiner*—Philip Tucker
*Attorney, Agent, or Firm*—Royston, Rayzor, Vickery, Novak & Druce, L.L.P.

[57] ABSTRACT

A solubilized iron reducing additive for acid solutions and method for preparing such a solubilized iron reducing additive. The additive includes an iron reducing agent reactable with ferric ions to produce therefrom ferrous ions and a spent iron reducing compound. The spent iron reducing compound is incapable of reacting with ferric ions to produce ferrous ions. So that the reducing process may continue, a regenerating agent is mixed with the iron reducing agent, the regenerating agent being reactable with the spent iron reducing compound for regenerating the spent iron reducing compound back to the iron reducing agent state. Because it has been found that the iron reducing agent and regenerating agent readily fall out of suspension as precipitates after short periods of time after mixing, a solubility facilitator is admixed thereto for facilitating establishment of the solubilized additive for acid solutions. A catalyst for catalyzing the reduction of ferric ions to ferrous ions in acid solutions may be optionally included.

19 Claims, 1 Drawing Sheet

SOLUBILIZED AND REGENERATING IRON REDUCING ADDITIVE

RELATED PATENT APPLICATIONS

This patent application claims priority to U.S. Provisional Application Ser. No. 60/029,824 filed Oct. 28, 1996 which is entitled Improved Method for the Reduction of Ferric Ions in Acidic Solutions for Well Treatment.

TECHNICAL FIELD

This invention relates generally to the reduction of ferric ions in aqueous acidic solutions. More specifically, this invention relates to a solubilized regenerating ferric ion reducing additive, and that additive's method of preparation. Through the use and employ of the additive, the invention also relates to the prevention of the formation of ferric iron-containing compounds in aqueous acidic compositions. This invention further relates to the treatment of a subterranean formation to stimulate the production of a fluid, such as a hydrocarbon, therefrom, wherein the treatment is conducted in the presence of iron-containing materials. This invention still further relates to the prevention of the formation of sludge in certain crude oils caused by the presence of ferric ions formed during the acid treatment of hydrocarbon-containing subterranean formations.

BACKGROUND ART

It is well established in the prior art that dissolved iron in the ferric oxidation state in aqueous acid solutions can lead to the formation of ferric iron-containing compounds in the bearing solution which produce insoluble iron solids when the pH of the acid solution increases to a value greater than approximately 4. In this regard, U.S. Pat. No. 4,683,954 to Walker and U.S. Pat. No. 5,084,192 to Dill teach that ferric compounds such as ferric hydroxide begin to precipitate from hydrochloric acid solution when the pH of the acid increases to a value of about 2.5 and greater and that precipitation is complete when the solution's pH is about 3.5. This precipitation phenomenon becomes a serious problem when an acid, such as hydrochloric acid, containing dissolved ferric iron is being used to react with a subsurface, acid soluble, calcareous formation, such as limestone, wherein the acid reaction causes the pH of the acid solution to typically spend to a value greater than the 4 and 5 range.

In addition to the precipitation problem discussed above which can be caused by the presence of ferric ion in acid, it is taught by several authorities that hydrochloric acid, particularly when at high concentrations of about 15% and greater, can cause the development of sludge when the acid is placed in contact with certain types of crude oil. The sludge formation problem is exacerbated when the acid which is in contact with the crude oil also contains ferric ion.

For purposes of this invention, sludge is defined as a solid material formed in crude oil containing asphaltenes and maltenes which constituents may, under certain conditions as pointed out above, precipitate from the crude oil. Sludge formed in crude oil while the crude oil is in a formation can render very difficult the task of recovery of the oil from the formation. Crude oil containing quantities of asphaltenes and maltenes subject to the production of sludge is referred to herein as sludging crude.

Accordingly, the sludging problem specifically addressed herein is caused by the combination of acid, especially high concentration hydrochloric acid, and ferric ion in contact with a sludging crude. This problem is particularly severe when the sludge is produced during formation acidizing.

Formation acidizing or simply, acidizing, is a well known method used to increase the flow of fluid from a subterranean formation. According to conventional practices, the underground formation is contacted with an acidic composition to react with and dissolve material contained therein for the purpose of increasing the permeability of the formation. The flow of fluid from the formation is therefore increased because of the increase in formation permeability caused by the dissolution of the material. A known method of acidizing comprises the steps of conducting an acid composition to the formation through tubing disposed in a borehole that penetrates the formation; forcing the acid composition into contact with the formation and permitting the acid to react with and dissolve certain materials contained therein to enlarge passages through the formation and thus increase the permeability of the medium so treated.

It is apparent that the object of formation acidizing, which is to increase formation permeability, can be frustrated if the very acid composition employed in the treatment to achieve that object produces an environment which fosters the development of solid material which can instead fill and plug pore spaces intended to be enlarged in the treated formation. Instead of enhancing fluid production, the consequent result is a failure to increase production, and even possibly decrease formation permeability.

In the context of formation acidizing, ferric ion can be introduced into the acid as a result of reaction between ferric compounds, such as rust and millscale, contacted in such locations as the tanks used to store the acid and/or transport it to a well that requires acidizing. Most common, such ferric compounds may be encountered on the interior walls of the conduit which conducts the acid down to the formation, reaction of the acid with ferrous compounds in the formation followed by oxidation of ferrous ion to ferric ion, and reaction between the acid and formation minerals that include ferric compounds, such as goethite, $FeO(OH)$, magnetite, $Fe_3O_4$, and hematite, $Fe_2O_3$.

Solutions to the problems of precipitation of ferric iron compounds from spent acid and the formation of sludge induced by the contact between ferric ion and acid with sludging crude revolve about the control of ferric ion in the acid solutions and/or the elimination of those ions from the solution. One suggested mitigating procedure is the removal of ferric compounds from the metal conduits through which the acid solutions are conducted down-hole, such as by a process known as pickling, prior to the conduit's utilization in acidizing procedures.

Alternatively, the Dill patent ('192) discloses the use of a blend of formic acid and acetic acid, in combination with anti-sludge agents and iron control agents. U.S. Pat. No. 4,823,874 discloses the use of anti-sludging agents such as quaternary ammonium salts of fatty amines in hydrochloric acid. U.S. Pat. No. 4,574,050 to Crowe discloses the use of an iron control agent, such as ascorbic acid and erythorbic acid, in hydrochloric acid. U.S. Pat. No. 5,063,997 to Pachla appears to disclose the reduction of ferric ion to ferrous ion in hydrochloric acid with hypophosphorous acid and catalyst material selected from cupric and cuprous compounds.

In U.S. Pat. No. 5,445,221 to Vinson, the reduction of ferric ion to ferrous ion in hydrochloric acid is disclosed with certain sulfur-containing, non-ionic, organic compounds in combination with a separate catalyst material selected from copper and vanadium compounds. The disclosure of the '221 patent is detailed and accurate with respect to the background of that invention and the needs for ferric ion reduction for applications in oil field settings. For these same purposes of background information regarding the needs and applications for ferric ion and iron reducing capabilities, U.S. Pat. No. 5,445,221 is expressly incorporated herein by reference.

For purposes of contrast with the present invention, it should be appreciated that the reduction of ferric iron in the acidizing process of the '221 patent is accomplished through a mercaptan function wherein the sulfur containing, non-ionic organic compound reacts with the ferric ions to convert them to the more innocuous ferrous ions. Within the '221 patent it is specifically recognized that the mercaptan function alone (i.e. through the use of 2-mercaptoethanol exclusively) is only capable of reducing ferric ion to ferrous ion when in solution with organic acids and not in inorganic acids such as hydrochloric acid. Still further, it was appreciated in the '221 patent that utilization of the mercaptan function was only possible in lower concentrations of organic acids, those lower concentrations being at least less that 28%. The success of using the mercaptan function in acetic acid which is organic is demonstrated in EXAMPLE 8 of the '221 patent. EXAMPLE 13 of the '221 patent clearly indicates that the mercaptan function is ineffective for reducing ferric ions even in very low concentrations of inorganic acids. In that example, an acid mixture of 2% inorganic hydrochloric acid was prepared with a 10% organic acetic acid. With ferric ions present in the form of ferric chloride, the addition of 2-mercaptoethanol caused no color change and therefore no reduction of the ferric ions to the innocuous ferrous ions. Subsequently, cupric chloride was then added to that solution and a color change resulted indicative of the reduction of the ferric iron to ferrous iron. From this result, it was believed that the added cupric chloride acted as a catalyst to the sulfur containing 2-mercaptoethanol which in turn reduced the ferric iron to ferrous iron.

As will be discussed in greater detail hereinbelow, however, the present invention demonstrates that the copper containing cupric chloride was not merely the catalyst, but was instead the actual reducing agent. This finding is consistently supported in the examples of the '221 patent where either a copper containing compound or a vanadium containing compound was always added in combination with a mercaptan functioning compound; the only exception being EXAMPLE 8 which was conducted exclusively with an organic acetic acid, and not the more common and frequently used inorganic acids of which hydrochloric is an example.

In view of the obvious need developed above for ferric iron reducing compounds, the affected industries such as the petroleum industry and those providing support thereto have endeavored to develop a reducing agent formulation that can be readily prepared, transported, stored and ultimately utilized for its ferric iron reducing capabilities. During the development of the present invention, it has been appreciated that a substantial impediment to providing such a product for use at remote locations, such as at a well site, is the inability to prepare and maintain a homogenous mixture of the several components preferred in a ferric iron reducing additive. More specifically, it was observed that when the reducing agent and what had previously been believed to be a catalyst were mixed, constituent components precipitated from the solution and were difficult to redissolve. As a result, the standard practice prior to this invention's development has been to supply the several ingredient compounds unmixed to the end-user for combination at the point of application or use. Because the proportions of the several components can be critical, this was undesirable in that the ability to accurately measure and mix the components is difficult at best, and often not possible, especially on location. As a result, a primary objective of the present invention became the capability to prepare a ready-to-use ferric ion reducing additive that can be produced by the manufacturer and then shipped and stored for extended periods of time without separation of the constituent components.

In view of these objectives and in response to the industrial requirements for ferric iron reducing agents, the present invention was developed and through its development several discoveries were made with respect to the function of the different constituent components ultimately incorporated therein and the benefits that can be potentiated and derived therefrom.

DISCLOSURE OF THE INVENTION

The present invention answers those needs enumerated above regarding at least the petroleum industry's requirements for ferric ion reducing agents. Through the course of researching and developing this invention, however, the activity and contributions of the several constituent compounds has been better appreciated and can therefore be better controlled and potentiated for end use.

Unlike earlier known products used for ferric iron reducing purposes such as that disclosed in the '221 patent, it has been discovered that it is the copper containing compounds and those of similar activity that are in fact the iron reducing agents, and not the sulfurs of the mercaptan components. The importance of the copper to the reducing compound has been expressly appreciated in Canadian Patent Application No. 2,070,212 regarding Compositions for Iron Control in Acid Treatments for Oil Wells. Like the reducing agents of the '221 patent, however, this Canadian Application promotes the copper compound as being a catalyst and not the actual iron reducing agent. In the present invention, it had been discovered that when a cuprous compound ($Cu^{+1}$) is added to a solution containing ferric ion ($Fe^{+3}$), electrons are exchanged so that the cuprous compound becomes cupric ($Cu^{+2}$) and the ferric ion becomes ferrous ($Fe^{+2}$). Through this reaction and changed state, the iron reduction process from ferric to ferrous iron is achieved. Among others, this reduction assists in avoiding the formation of sludge in well acidizing processes.

As a complement to this discovery regarding the copper compound's action as a reduction agent, it has also been learned that in the presence of a sulfur containing compound such as those found in the mercaptan functioning compounds, the sulfur component reacts with the now cupric ($Cu^{+2}$) compound to convert it back to its cuprous ($Cu^{+1}$) state ready for a subsequent iron reducing reaction. In this way, the mercaptan or sulfur containing component acts not as the iron reducing agent itself, but instead as a regeneration agent to the copper compound that is in fact the iron reducing agent. In fact, the sulfur containing compound will not reduce ferric ion ($Fe^{+3}$) in an organic acid such as hydrochloric acid.

As explained above, supplying the copper compound and sulfur containing compound to the end user for self mixing is disadvantageous for several reasons, but with the most important reason being that accurate measurements are required for economical and proper functioning of the resulting iron reducing additive.

An impediment, however, was discovered as described hereinabove with respect to the resistance of the copper and sulfur bearing compound to solubly mix together and remain in a stable combination or solution. In those experiments where the two components were mixed together directly or in water solution, precipitate solids formed thereby yielding cuprous salts that were difficult, if not impossible to redissolve into the solution.

Through the process of experimentation, thiourea was attempted as a solubilizer, but it was discovered that the cuprous state element fell out of solution after a temperature of about 100 degrees Fahrenheit was reached. This was unacceptable in that such a temperature was typically and often reached during transportation and storage of the solution after its manufacture, but prior to its use.

As a result of further experimentation, ammonia was discovered as a highly advantageous solubility facilitator that enabled the iron reducing agent and the regenerating agent to be combined into a solubilized iron reducing additive. When mixed together, a solution in which the iron reducing agent and the regenerating agent are carried is formed. The stability of such a solution has been tested up to temperatures well above 100 degrees Fahrenheit; temperatures which are typically encountered during transport and storage of additives used in oil field operations in such facilities as closed buildings exposed to direct sunlight and without cooling capabilities. Under these conditions, the additive solution of the present invention that includes the iron reducing agent, the regenerating agent and the solubility facilitator in the form of ammonia have remained soluble for periods in excess of six months. As a result, this combination is not only beneficial to the manufacturer because of its substantial shelf life, but it is likewise popular with the end user in that it may be stored for extended periods of time before use. Of equal importance is that the additive's constituent components have been accurately premeasured and solubilized into a single solution for easy utilization at a remote site such as in the oil field.

As explained above, the cuprous compound is the one that actually combines with the ferric ion to reduce it to the innocuous ferrous ion. After such a reaction wherein the cuprous compound has been converted to a cupric compound, the sulfur component reacts therewith to convert that cupric compound back to a cuprous compound that is once again ready to react with ferric ions. As a result, the copper containing iron reducing agent is regenerated by the sulfur containing compound in a sulfur consuming process. Therefore, the capability of the prepared reducing additive to reduce ferric ion to ferrous ion is dependent to some extent on the amount of copper compound, but to a greater extent upon the amount of sulfur containing compound which is consumed and not regenerated in the reducing process.

It has been discovered that the reducing reaction slows so substantially in higher concentrations of acid that it becomes ineffective. As a result, a catalyst is required that enables the iron reducing agent to continue its ferric ion reduction at suitable rates. As appreciated in the Canadian Patent Application '212, a successful catalyst is found in iodide bearing compounds. What was not appreciated in the '212 application is that the iodide is converted to iodine during the catalytic process. In the course of the present invention's development, it has been discovered that the iodine is similarly regenerated back to the iodide state by the sulfur containing compound much like the iron reducing agent. As a result, the mere presence of the iodide is initially important, but as long as the sulfur containing compound is also present it can be continuously regenerated provided sulfur containing compound is present. Still further, it has been discovered that iodide will itself act as a reducer, but because iodide is substantially more expensive than copper containing compounds, it is most advantageously used as a catalyst or potentiator instead of as the actual reducing agent.

Though not critical, it has been found advantageous to first mix the sulfur containing compound together with the ammonia and then add the copper containing compound thereto. The benefit achieved by using such an order is that the copper is prevented from forming a precipitate that must then be redissolved, often with substantial difficulty. By utilizing this preferred order of add mixing, a solubilized iron reducing additive is immediately achieved and maintained until end use. It has also been found possible to first mix the ammonia and copper containing compound together and then add the sulfur containing compound. What is important, however, is that the ammonia be first mixed with either of the copper or sulfur containing compounds or the two together at the same time, but the latter two should not be initially mixed together without the ammonia.

Other benefits are known to be derived from use of such a solution manufactured according to the present invention in environments other than acidizing subterranean formations. As an example, it has been found that an acid solution that is loaded with a copper bearing compound deteriorates metal tubing within which it is conducted at a substantially reduced rate when an "acid inhibitor" such as acetylenic alcohols and certain quaternary ammonium salts is also utilized. As a result, the additive of the present invention acts to potentiate or intensify the action of the inhibitor. It is expected that as the present invention is utilized more extensively, substantial and additional beneficial uses will be discovered that are based on the principles, features and characteristics disclosed herein.

Referring now to specific embodiments of the solubilized iron reducing additive and methods for preparing the same, additional benefits and advantageous features will be appreciated. In one embodiment, the present invention takes the form of a solubilized iron reducing additive for acid solutions. The additive includes an iron reducing agent reactable with ferric ions to produce therefrom ferrous ions and a spent iron reducing compound. The spent iron reducing compound is incapable of reacting with ferric ions to produce ferrous ions. So that the reducing process may continue, a regenerating agent is mixed with the iron reducing agent, the regenerating agent being reactable with the spent iron reducing compound for regenerating that spent iron reducing compound back to the iron reducing agent state. Because it has been found that the iron reducing agent and regenerating agent readily fall out of solution as precipitates after short periods of time after mixing, a solubility facilitator is admixed thereto for facilitating establishment of the solubilized additive for acid solutions.

In a preferred embodiment, the iron reducing agent is a cuprous compound reactable with ferric ions to produce cupric compound and ferrous ions. The regenerating agent is a sulfurous compound reactable with the cupric compound for regenerating the cupric compound back to a cuprous compound. The solubility facilitator is ammonia.

Optionally, a catalyst for catalyzing the reduction of ferric ions to ferrous ions in acid solutions may be included. In a preferred embodiment, the catalyst is an iodide compound capable of being regenerated by the regenerating agent back from a reacted iodine state.

As a result of this combination of components, the solubilized iron reducing additive is maintainable in a solubilized state for at least six months and constituent components are prevented from precipitating therefrom. Still further, the solubilized state is maintainable in temperatures at least as great as 130 degrees Fahrenheit.

To achieve the most readily solubilized iron reducing additive for acid solutions as described herein, the order of admixing the components of the additive preferably begins with the regenerating agent to which the solubility facilitator is added and subsequently the iron reducing agent is combined therein.

Among those benefits and improvements that have been disclosed, other objects and advantages of this invention will become apparent from the following description taken in conjunction with the accompanying drawings. The drawings constitute a part of this specification and include exemplary embodiments of the present invention and illustrate various objects and features thereof.

Figure 1:
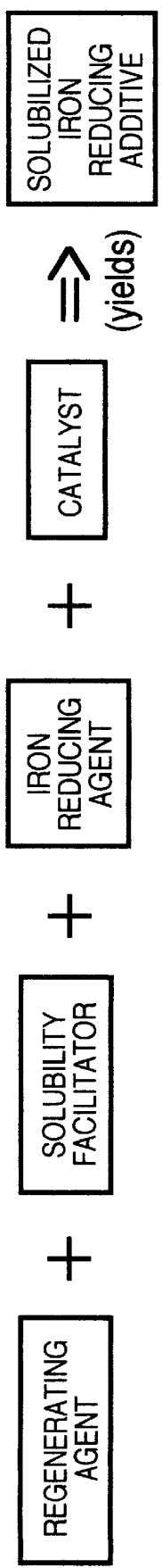
FIG. 1 is a schematic diagram of the combination of the solubilized iron reducing additive.
Figure 2:
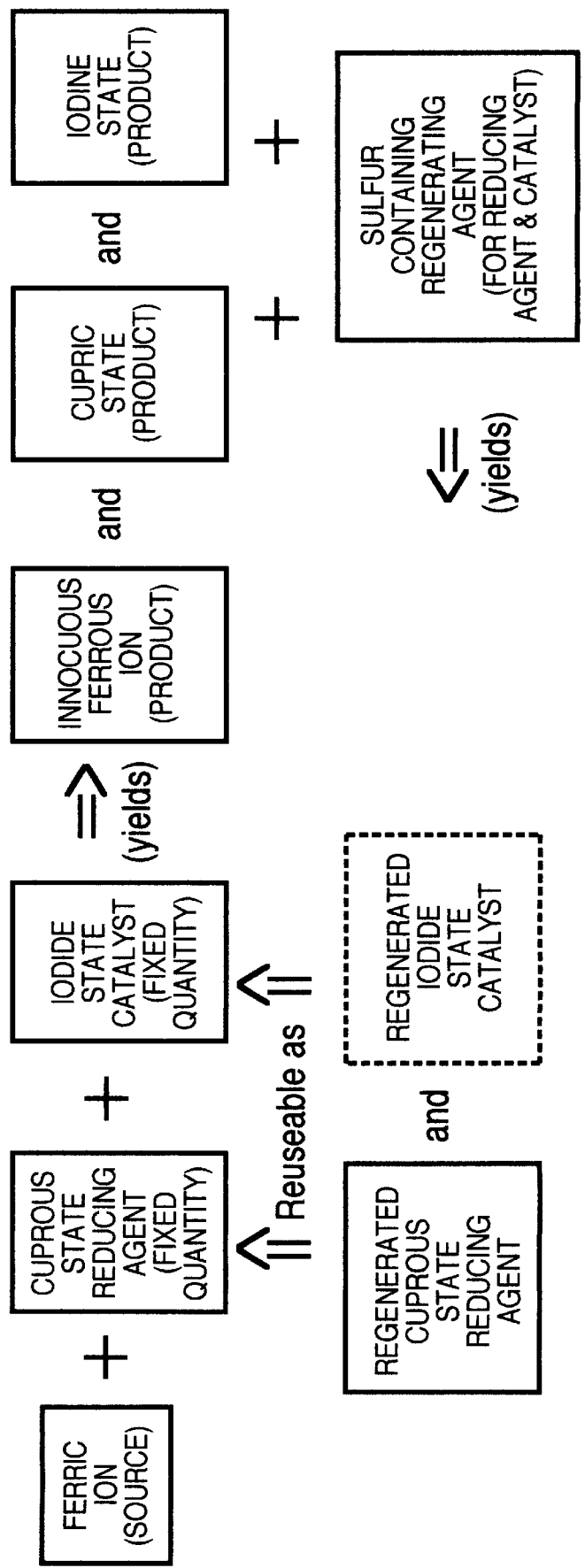
FIG. 2 is a schematic diagram of the action of the solubilized iron reducing additive in a ferric iron bearing acid solution.

In each figure, sources of consumable compounds are shown in boxes bounded by heavy or thick lines, while boxes bounded by dashed-lines indicate optional additives and resulting products.

MODE(S) FOR CARRYING OUT THE INVENTION

As required, detailed embodiments of the present invention are disclosed herein. It is to be understood, however, that the disclosed embodiments are merely exemplary of the invention that may be embodied in various and alternative forms. Therefore, specifically specified compounds and functional details disclosed herein are not to be interpreted as limiting, but merely as a basis for the claims and as a representative basis for teaching one skilled in the art to variously employ the present invention.

The additive compounds of the present invention consist of three basic components, i.e., a copper containing reducing agent, a sulfur containing regenerating agent, and a solubility facilitator for solubilizing the former two compounds stably together. It is preferred that the solubilizing agent be selected from the group consisting of ammonia and simple amines, including, but not necessarily limited to, methylamine, dimethylamine, trimethylamine, ethylamine, diethylamine, triethylamine, ethanolamine, and alkyl-substituted ethanolamines, diethanolamine, and alkyl-substituted diethanolamines, triethanolamine, morpholine, isopropanolamine, and diisopropanolamine. Most preferred of these, however, is ammonia.

The copper containing reducing agent is most advantageously obtained from a cuprous state compound ($Cu^{+1}$) since that is the state from which the copper compound combines to reduce the ferric iron to the more innocuous ferrous iron. An example of such a source is cuprous chloride. Substantially the same benefits, however, may be enjoyed from a cupric state compound that is first converted to the cuprous state through a reaction with the sulfur containing regenerating agent. From an economic perspective and relatively easy solubilities of commercially available forms of these different components, cupric chloride is most preferred.

A wide variety of sulfur-containing organic compounds are suitable for use in this invention. The requirements for such compounds are that they possess sufficient solubility in the acidic well-treating fluid employed to give a homogeneous solution when used in amounts sufficient to reduce an anticipated quantity of ferric ion through the regenerative process. Still further, those compounds' products of reaction must also be predominantly soluble in the treating fluid. Examples of classes of such sulfur-containing organic compounds include but are not limited to alkyl thiols, alkyl dithiols, thioalcohols, thioureas, thioamines, thioamides, and esters and salts of mercaptoalkanoic acids. Some specific examples of the classes include butanethiol, ethanedithiol, 2-meracaptoethanol, 1-mercapto-2-propanol, 1-thioglycerol, 3-mercapto-1-propanol, thiourea, dimethylthiourea, diethylthiourea, trimethylthiourea, ethylenethiourea, methylthiourea, ethylthiourea, phenylthiourea, 2-thio-1 aminoethane, thioacetamide, glycol dimercaptoacetate, trimethylolpropane tris(3-mercaptopropionate), pentaerythritol tetrathioglycolate, trimethylolpropane trithioglycolate, and ammonium thioglycolate. More preferred among these are compounds which are liquid or which are very soluble in inexpensive solvents; examples of the more preferred sulfur-containing regenerating agents are 2-mercaptoethanol, 1-mercapto-2-propanol, and ammonium thioglycolate. Most preferred is 2-mercaptoethanol.

The ferric ion reducing additive of this invention can be readily prepared in a preformed mixture of regenerating agent with ammonia or amine that is then added to the copper-containing reducing agent. In any event, the solubility of the reducing agent and regenerating agent is promoted by the solubility facilitator that is usually in the form of ammonia or amine. The proportions of the components to be used in the combination are subject to considerable latitude: for each 100 parts of sulfur-containing regenerating agent it is preferred that from about 0.5 to about 60 parts ammonia or amine be used. It is also preferred that the amount of copper reducing agent to be used range from about 0.2 to about 40 parts. Precise proportions may be arrived at by one skilled in the art by considering among others: (1) the rapidity with which it is desired to reduce ferric ion to ferrous ion; (2) the amount of ferric ion anticipated to require reduction; (3) the conditions under which the reducing mixture is to be used, with those conditions including reservoir temperature and composition of the acidic treating fluid used; and (4) by economic considerations.

The acidic well-treating fluid may be any of those commonly in use in acidizing including hydrochloric acid of concentrations up to about 24%, mixtures of hydrochloric and hydrofluoric acids, and mixtures of either of these with organic acids such as formic acid, acetic acid, glycolic acid, and citric acid. Other ingredients known to be useful in acidizing compositions can be included in the acidic treating fluids of this invention. Such other ingredients include, but are not necessarily limited to demulsifiers, acid inhibitors, antisludge agents, dispersants, gelling agents, and mutual solvents.

Under some conditions, particularly in strong acid solutions having 28% and higher acid content, but also possibly ranging downward to as low as 15% or less, the addition of a reducing catalyst may be desirable or required. As was appreciated in the Canadian Patent Application '212, a suitable catalyst for such purposes is iodine containing compounds. Through experimentation, it has been discovered that iodide will react in the ferric iron reduction process to iodine. Through this same experimentation, it has also been discovered that like the reacted cupric iron reducing agent, iodine can be regenerated by the regenerating agent back to an iodide state for subsequent catalytic function. In this manner, a limited amount of the more expensive iodine containing compound can be utilized in the reducing additive when required so long as a sufficient amount of regenerating agent is also present for regenerating both the iron reducing agent and the catalyst.

The following examples are provided to illustrate the practice of the invention as well as certain preferred embodiments thereof. The examples should not be construed as limiting in any way to the spirit or scope of the invention and are not provided as such a limitation.

EXAMPLE I

To a 50-milliliter sample of 2-mercaptoethanol was added 2 milliliters of a solution including 40.3% cupric chloride dihydrate in water. Upon stirring, the cupric chloride solution, which on initial mixing had formed a lumpy precipitate, dissolved to give a clear and colorless solution. However, within one minute of mixing, a white precipitate thought to be a cuprous salt formed and fell to the bottom of the reaction vessel. Continued stirring failed to dissolve this precipitate. This illustrates the difficulty encountered in attempting the directly mix the reducing agent and regenerating agent into a soluble solution without the benefit of a solubility facilitator such as ammonia.

EXAMPLE II

The experiment of Example I was repeated, except that 3 milliliters of commercial 28% aqua ammonia was dissolved in the 2-mercaptoethanol prior to the addition of 2 milliliters of cupric chloride. Some precipitate formed on initial mixing, but it redissolved within a few seconds to give a clear, golden-yellow solution which remained free of precipitate for a period of at least one month after mixing. A portion of this solution was also held at a temperature of 130 degrees Fahrenheit for more than a week, and still it remained precipitate free.

EXAMPLE III

A solution of an ammoniacal complex of copper was prepared from 4.5 milliliters of water, 3.0 milliliters of aqua ammonia, and 2.5 milliliters of the cupric chloride solution referred to in Example I. This entire solution was slowly added to 50 ml of 2-mercaptoethanol. No precipitate formed in the resulting golden-yellow solution for a period of at least one month after mixing.

EXAMPLE IV

A sample of the solution of Example II containing 2-mercaptoethanol, aqua ammonia, and cupric chloride solution was tested to determine its ability to reduce ferric iron to the ferrous form in an acid solution. To 100 milliliters of a 15% solution of hydrochloric acid was added sufficient ferric chloride to give a ferric ion concentration of 1250 parts per million. To this yellow solution was added 0.30 milliliter of the mixture of Example II. The color of the acid solution disappeared over a period of about ten seconds, showing the reduction of ferric iron to the ferrous state.

EXAMPLE V

A solution of 100 milliliters of 15% hydrochloric acid containing ferric iron at 1250 parts per million concentration was added 0.50 gram of cuprous chloride. The cuprous chloride slowly dissolved and the yellow color of ferric iron was replaced by a pale bluish color characteristic of cuprous chloride; thus, indicative of a reduction of the ferric ion to ferrous ion.

EXAMPLE VI

A solution of 100 milliliters of 15% hydrochloric acid containing 5000 parts per million of ferric iron was prepared and 0.5 milliliter of the reducing solution of EXAMPLE II containing 28% aqua ammonia, 2-mercaptoethanol and cupric chloride was added thereto. The dark yellow color of the solution lightened perceptibly, but did not disappear; thus illustrating incomplete reduction of ferric iron to the ferrous state. Upon the addition of 1.0 milliliter of 2-mercaptoethanol, the color of the acid solution disappeared over a period of about 20 seconds. This demonstrates the regeneration of the reducing agent by the addition of a suitable quantity of an appropriate sulfur containing compound.

EXAMPLE VII

A solution of 100 milliliters of 28% hydrochloric acid containing 1000 parts per million of ferric iron was prepared. To this brownish-yellow solution, 0.8 milliliter of the reducing solution of EXAMPLE II containing 28% aqua ammonia, 2-mercaptoethanol and cupric chloride was added thereto. No significant color change was detected. After 15 minutes, 0.01 milliliter of a 40% solution of potassium iodide was added to the mixture. The brownish-yellow color almost immediately faded to a colorless and clear solution.

A ferric ion reducer and its method of use has been described herein. These and other variations, which will be appreciated by those skilled in the art, are within the intended scope of this invention as claimed below. As previously stated, detailed embodiments of the present invention are disclosed herein; however, it is to be understood that the disclosed embodiments are merely exemplary of the invention that may be embodied in various forms.

INDUSTRIAL APPLICABILITY

The present invention finds applicability predominantly in the oil field services industry, and more particularly in well acidizing procedures. It has been discovered, however, that the additive presents utility for other purposes in this same industry. For example, the additive may be used as a potentiator or intensifier for acid inhibitors utilized in acid solutions to prevent deterioration of the metal conduits through which the acid solution is conducted. As the solubilized product is utilized and made available to different markets, it is anticipated that further utility will be appreciated and exploited.

What is claimed is:

1. A solubilized iron reducing additive for acid solutions, said iron reducing additive comprising:
   an iron reducing agent reactable with ferric ions to produce therefrom ferrous ions and a spent iron reducing compound, said spent iron reducing compound being incapable of reacting with ferric ions to produce ferrous ions;
   a regenerating agent mixed with said iron reducing agent, said regenerating agent reactable with said spent iron reducing compound for regenerating said spent iron reducing compound back to said iron reducing agent; and
   a solubility facilitator mixed with said iron reducing agent and said regenerating agent for facilitating establishment of a solubilized solution of said iron reducing agent and said regenerating agent into an iron reducing additive for acid solutions, and said solubility facilitator is ammonia.

2. The solubilized iron reducing additive for acid solutions as recited in claim 1, wherein said iron reducing agent is a cuprous compound reactable with ferric ions to produce a cupric compound and ferrous ions.

3. The solubilized iron reducing additive for acid solutions as recited in claim 2, wherein said regenerating agent is a sulfurous compound reactable with said cupric compound for regenerating said cupric compound back to a cuprous compound.

4. The solubilized iron reducing additive for acid solutions as recited in claim 1, further comprising:
a catalyst for catalyzing the reduction of ferric ions to ferrous ions in acid solutions.

5. The solubilized iron reducing additive for acid solutions as recited in claim 4, said catalyst is an iodide compound capable of being regenerated by said regenerating agent.

6. A method of preparing a solubilized iron reducing additive for acid solutions, said method comprising the steps of:
obtaining an iron reducing agent reactable with ferric ions for producing therefrom ferrous ions and a spent iron reducing compound, said spent iron reducing compound being incapable of reacting with ferric ions to produce ferrous ions;
combining a regenerating agent with said iron reducing agent, said regenerating agent reactable with said spent iron reducing compound for regenerating said spent iron reducing compound back to said iron reducing agent state; and
mixing a solubility facilitator with at least one of said iron reducing agent and said regenerating agent prior to said combining of said iron reducing agent and said regenerating agent together thereby facilitating the establishment of a solubilized solution of said iron reducing agent and said regenerating agent into an iron reducing additive for acid solutions, and said solubility facilitator is ammonia.

7. The method of preparing a solubilized iron reducing additive for acid solutions as recited in claim 6, wherein said iron reducing agent is a cuprous compound that reacts with ferric ions to produce a cupric compound and ferrous ions.

8. The method of preparing a solubilized iron reducing additive for acid solutions as recited in claim 7, wherein said regenerating agent is a sulfurous compound that reacts with said cupric compound for regenerating said cupric compound back to a cuprous compound.

9. The method of preparing a solubilized iron reducing additive for acid solutions as recited in claim 6, further comprising:
adding a catalyst for catalyzing the reduction of ferric ions to ferrous ions in acid solutions.

10. The method of preparing a solubilized iron reducing additive for acid solutions as recited in claim 9, wherein said catalyst is an iodide compound capable of being regenerated by said regenerating agent back to an iodide state from a reacted iodine state.

11. The method of preparing a solubilized iron reducing additive for acid solutions as recited in claim 6, further comprising:
maintaining the solubilized iron reducing additive in a solubilized state for at least 30 days by preventing constituent components from precipitating therefrom.

12. The method of preparing a solubilized iron reducing additive for acid solutions as recited in claim 6, further comprising:
maintaining the solubilized iron reducing additive in a solubilized state in temperatures at least as great as 130 degrees Fahrenheit.

13. The method of preparing a solubilized iron reducing additive for acid solutions as recited in claim 6, wherein the order of admixing the components of the additive begins with said regenerating agent to which said solubility facilitator is added and subsequently said iron reducing agent is combined therein.

14. The method of preparing a solubilized iron reducing additive for acid solutions as recited in claim 7, wherein the order of admixing the components of the additive begins with said regenerating agent to which said solubility facilitator is added and subsequently said iron reducing agent is combined therein.

15. The method of preparing a solubilized iron reducing additive for acid solutions as recited in claim 14, further comprising:
preventing said cuprous compound from forming a difficultly dissolvable precipitate.

16. A solubilized iron reducing additive for acid solutions, said iron reducing additive comprising:
a copper reducing agent reactable with ferric ions to produce a cupric compound and ferrous ions;
a sulfur-containing regenerating agent mixed with said iron reducing agent, said regenerating agent being reactable with said spent iron reducing compound for regenerating said spent iron reducing compound back to said iron reducing agent;
a solubility facilitator mixed with said iron reducing agent and said regenerating agent for facilitating establishment of a solubilized solution of said iron reducing agent and said regenerating agent into an iron reducing additive for acid solutions, said solubility facilitator being ammonia; and
a catalyst for catalyzing the reduction of said ferric ions to ferrous ions in acid solutions.

17. The solubilized iron reducing additive for acid solutions as recited in claim 16, wherein said sulfur-containing regenerating agent is ammonium thioglycolate being reatable with said cupric compound for regenerating said cupric compound back to a cuprous compound.

18. The solubilized iron reducing additive for acid solution as recited in claim 16, wherein said sulfur-containing regenerating agent is 2-mercaptoethanol being reactable with said cupric compound for regenerating said cupric compound back to a cuprous compound.

19. The solubilized iron reducing additive for acid solution as recited in claim 16, wherein said catalyst is an iodide compound capable of being regenerated by said regenerating agent.

* * * * *